E. E. FULLER.
Hay-Press.
No. 216,785. Patented June 24, 1879.
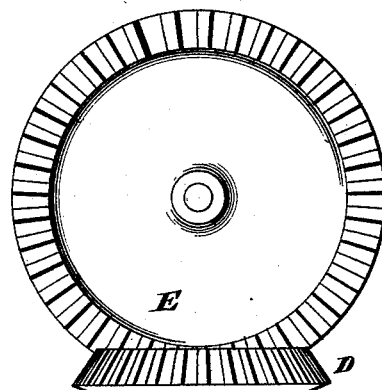
Fig. 1.
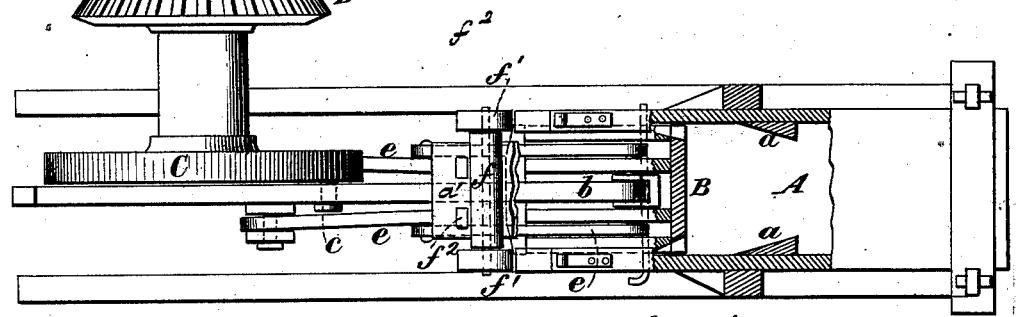
Fig. 2.
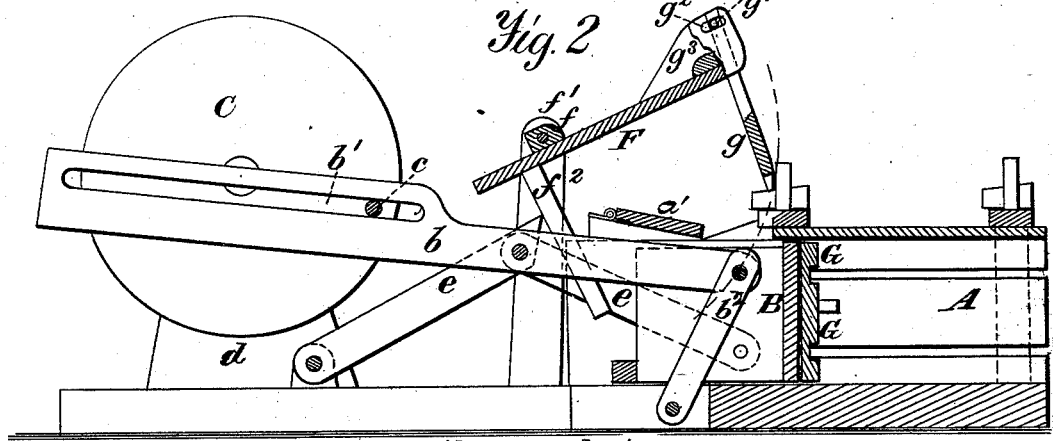
Fig. 3.
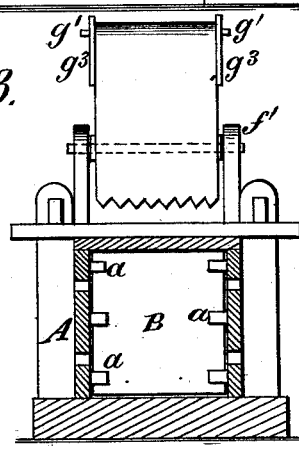
Witnesses.
A. Ruppert,
J. H. Lange.
Inventor:
Eben E. Fuller,
per Edson Bros.
Attorneys.

UNITED STATES PATENT OFFICE.

EBEN E. FULLER, OF ST. FRANCIS, ASSIGNOR OF ONE-HALF HIS RIGHT TO GEORGE HOUGHTON, OF CARVER, MINNESOTA.

IMPROVEMENT IN HAY-PRESSES.

Specification forming part of Letters Patent No. 216,785, dated June 24, 1879; application filed February 19, 1879.

*To all whom it may concern:*

Be it known that I, EBEN E. FULLER, of St. Francis, in the county of Anoka and State of Minnesota, have invented certain new and useful Improvements in Hay-Presses; and I do hereby declare that the following is a full, clear, and exact description of the invention, which will enable others skilled in the art to which it appertains to make and use the same, reference being had to the accompanying drawings, and to letters of reference marked thereon, which form a part of this specification, and in which—

Figure 1 is a plan view of my improved hay or cotton press. Fig. 2 is a longitudinal section thereof, and Fig. 3 is a cross-section of the same.

Corresponding parts in the several figures are denoted by like letters.

This invention relates to certain improvements in hay or cotton presses effecting the successive folding or introducing and pressing of the cotton or hay; and to these ends it consists, primarily, in the employment, with the press-chamber, of a plunger or follower and a folder, the follower being connected by toggle-levers to another lever affixed to a fixed point and to a slotted or other pitman connected to driving mechanism, and the folder having a downwardly-projecting arm or arms and a folder proper, substantially as hereinafter more fully set forth.

In the accompanying drawings, A refers to a box or the press-chamber, into which the hay or cotton is pressed in the form of bales. This press-chamber is provided with a cover, keyed thereon, so as to permit of its being raised or lowered, as may be desired. This chamber may be, or is, designed rather to be of sufficient length to accommodate the holding of two bales at a time, by which one, after formation, may be tied therein during the formation of a second bale. In the sides of this chamber are the slots, as is usual with this class of presses, through which the bale or bales are tied.

$a\ a$ are dogs, either rigidly or yieldingly attached to the inner sides of the chamber A, and which are arranged therein with reference to the size of the bale or bales. These will be further referred to hereinafter.

B is a plunger or follower arranged to operate within the chamber A. $e\ e$ are toggle-levers, two being pivoted to the plunger or follower and two to the outer extension of the base or support of the chamber, and both sets pivoted together at their upper ends by a pivot or axis. $b$ is a pitman connected to the pivot at the toggle-joint of the levers $e\ e$, and having a slot, $b^1$, which receives a pin or crank, $c$, projecting from the face of the disk or eccentric C. The other end of this pitman is pivoted to link $b^2$, pivoted to the base. The axis or shaft of the eccentric C, which is supported in a post, $d$, is provided with a toothed wheel, D, to which motion may be transmitted from any suitable motor through the crown-wheel E. The above mechanism effects the continuous reciprocation of the plunger or follower. F is a folder, with its axis hung in uprights $f^1$, and provided with downward-projecting arms $f^2$, resting against the projecting ends of the levers $e$ at their toggle-joint or against the pivot thereof, by which it will be observed that, as the follower or plunger is moving backwardly and the levers $e$ are rising, the said arms $f^2$ will be allowed to swing rearwardly, and permit the folder to descend and introduce or fold the hay or cotton down into chamber A directly in front of the plunger or follower.

To the outer or forward end of the folder F is hung a board or the folder proper, $g$, whose upper end is provided with projections $g^1$, working in inclined or curved slots $g^2$ in plates or side pieces $g^3$ upon the said end of folder, by which the folder proper is allowed to swing by gravity within a sufficiently small arc to enter the chamber A in front of the plunger or follower within the prescribed limit.

G is a head-block, which is duplicated to provide one for each end of a bale, which blocks, with the pressure of the follower or plunger, effect the pressing of the bale compactly and into the smallest possible space, which is greatly desirable.

To revert to the bale-holding dogs $a\ a$, it will be observed that, by their arrangement, they prevent the hay or cotton of the forming bale, after the hay or cotton has been forced by the follower past them, from returning with the follower in its rearward movement.

$a'$ is an apron hinged to its supporting-pieces directly opposite the front end of the chamber A. The cotton or hay is fed upon this apron to and beneath the folder, which introduces it to the follower. By being hinged the apron is permitted to be elevated, and the chamber and space below allowed to be readily cleaned.

Having thus fully described my invention, I claim and desire to secure by Letters Patent—

1. In a hay or cotton press, the combination, with a chamber, A, of a plunger or follower, B, toggle-levers $e\ e$, pitman $b$, connected to an eccentric or crank-shaft, C, and folder F, having downwardly-projecting arm or arms $f^2$, and folder proper, $g$, substantially as and for the purpose set forth.

2. The combination, with the plunger B, of the pitman $b$, fulcrumed upon the pivot at the toggle-joint of the toggle-levers $e\ e$ and pivoted to a link, $b^2$, in turn pivoted to a base, and which levers $e$ are connected to the plunger B, substantially as and for the purpose set forth.

3. The combination, with the chamber A, of the folder F, having the downwardly-projecting arms or arm $f^2$ and folder proper, $g$, and the toggle-levers $e\ e$, substantially as and for the purpose set forth.

4. The folder F, provided with the folder proper, $g$, hung therefrom, and having projections $g^1$ working in inclined or curved slots $g^2$ in plates or side pieces attached to the folder F, substantially as and for the purpose set forth.

In testimony that I claim the foregoing as my own I hereunto affix my signature in presence of two witnesses.

EBEN E. FULLER.

Witnesses:
E. K. WOODBURY,
GEO. W. MORRILL.